April 26, 1960     O. A. VIELI ET AL     2,933,767
IMPROVED METHOD OF POST COMPRESSING A CARBAMIDE RESIN FOAM
Filed Sept. 21, 1954
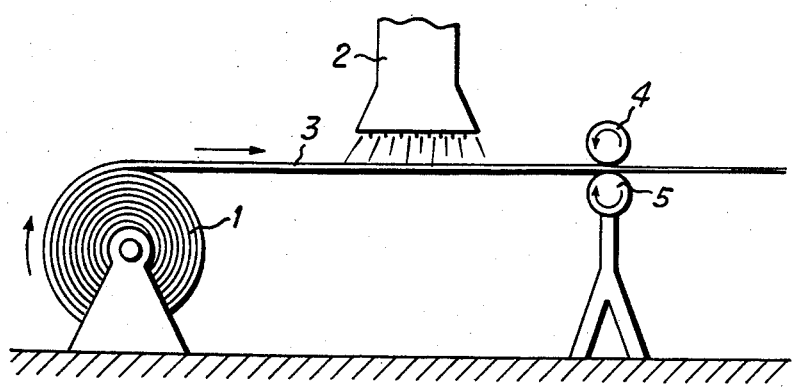
INVENTORS:
Otto A. Vieli and Dieter Klenk
BY
Richards y Geier
ATTORNEYS

2,933,767
IMPROVED METHOD OF POST COMPRESSING A CARBAMIDE RESIN FOAM

Otto A. Vieli, Rhazuns, Switzerland, and Dieter Klenk, Main, Germany, assignors to Cogepa Etablissement Commercial, Vaduz, Liechtenstein, a company of Liechtenstein Application September 21, 1954, Serial No. 457,526

Claims priority, application Switzerland September 23, 1953

1 Claim. (Cl. 18—48)

The present invention relates to bodies made of plastic foam, particularly of partly condensed or polymerized synthetic resin foam belonging to the group of compounds known under the collective term of aminoplasts. As is well-known, the term aminoplasts covers synthetic resins based on compounds and formaldehydes containing amino groups, to which urea and thio urea resins, carbamide resins and melamine resins belong.

The manufacture of foam masses from polymerization and polycondensation resins is known; thus, there exist various methods of making from these products foam masses which can be used for special purposes. Also already known is the process of working substances into these foam masses during manufacture in order to promote certain properties, e.g. bending strength etc. All these foam products, however, still reveal certain defects, particularly as regards their bending and tensile strength, or their resistance to cracking, bursting and abrasion.

According to the invention it has been established that the properties of such foam bodies made of synthetic resin can be substantially improved, with respect to the above-named defects, by post-compression of the partly or fully condensed, or polymerized foam. This post-compression is effected by the application of mechanical forces, which cause the volume of the foam bodies to be reduced; it is preferably accompanied by simultaneous heat treatment and possibly carried out when the moisture content of the foam is at an exactly predetermined level.

The products obtained by the method according to the invention are not only more economical, but also more versatile in their application. According to the invention it is possible to make from foam products articles which could not be manufactured with previous foam masses. Furthermore, it must be pointed out that manufacture is considerably simplified and, above all, that this method opens up other fields of application for synthetic resin foams.

If desired, the heat and/or pressure treatment can also be varied during the process. Such variation will, in principle, depend merely on whatever properties and forms are intended for the final products or articles. It is also possible to treat either the whole final product or simply parts of the foam by this method, only the surface or some other point of a foamy plastic being subjected to the treatment.

Plastic foam is, in general, manufactured in such a way that a foam forming substance is effectively whipped into foam, the plastic, and, if they are not already contained in the foam mass, appropriate catalysts being added at a suitable moment during the process. The plastic foam thus produced must, even before the hardening process begins, possess a minimum content of plastic in each foam lamella, if the final product is to reveal the mechanical quality desired. It becomes all the more difficult to fulfil this condition, the larger the number of pores or foam lamellae present per unit of volume of the plastic foam and the higher the desired proportion of plastic per unit of weight of the plastic foam is supposed to be. To improve the mechanical properties of the plastic foam, which is desirable for some bodies made of this material, both the fineness of the structure and the proportion of plastic must, however, be increased, which is extremely difficult with the means available during foam production itself and generally leads to lack of homogeneity.

An improvement of the structure and an increase in the content of plastic per proportion of weight in the final product can, however, be achieved within wide limits by post-compression according to the invention. Such post-compression is particularly simple and is carried out merely by pressure-treating a plastic foam which hardens from the deformable initial state to the stable final state in a relatively short time and without additional measures. In the initial state the plastic foam is still easily deformed and such deformations are of a permanent nature, whereas after the stable final state has been attained only slight elastic deformations are possible without destroying the plastic foam body.

If deformation is effected by pressure treatment alone when the hardening process has proceeded beyond the stage suitable for a non-elastic post-compression, there results a post-compression wherein the reduction in volume is partly reversed, after the pressure ceases, by the elasticity of the plastic foam thus post-compressed; in other words, the volume increases again to a certain extent. For this reason this type of deformation is called semi-elastic post-compression.

However, such foam bodies can also be post-compressed when the hardening process has been completed, if suitable heat treatment is applied simultaneously with the reduction in volume brought about by pressure. This post-compression under the influence of heat is appropriate for most applications of such foam bodies consisting of aminoplasts, particularly those of carbamide resins, because storing the plastic foam for a certain time has proved advantageous and enables the structure to mature to the point of complete stability.

The post-compression, accompanied by simultaneous heat treatment, of stored and matured plastic foam consisting of aminoplasts is by no means effected by evenly heating the foam bodies in order to soften the lamellae and foam framework for a subsequent non-elastic deformation of the entire foam mass. Rather is the post-compression effected with an elastic and at least partly reversible compression of the inner portions of the body as well as by the influence of relatively high temperatures exerted on the external parts of the body for a short time. This produces a tough but quite thin, skin-like body surface which possesses sufficient strength to keep the body in the shape imposed upon it during the treatment, thus counteracting the tendency of the compressed foam mass inside the body to expand. This outer skin may enclose the foam body completely or only partly, according to the direction of compression of the said body.

In the case of post-compression by simultaneous pressure and heat treatment it has proved advantageous to work the matured plastic foam consisting of aminoplasts when its moisture content is at a predetermined level. For this purpose the foam can be stored, to let it mature, in an atmosphere with a given moisture content or the foam matured in dry surroundings can be moistened before being worked, for instance, by spraying it with a certain quantity of liquid. Water, or aqueous steam can be used as the liquid, depending on the use intended for the foam body, but other organic and inorganic liquids of a basic, acid or neutral nature can be employed, in so far as they are compatible with synthetic resin foam.

The post-compression factor appropriate in each case, that is to say the ratio between the original volume of the plastic foam and the volume of the post-compressed body, depends on the latter's intended use and may vary within wide limits. By way of example, in the case of a carbamide resin foam of fine structure a post-compression factor of 5 was obtained without difficulty, the bulk density of the post-compressed body being approximately five times greater than that of the carbamide resin foam. Such an improvement in the fine structure of plastic foam has not yet been achieved with other means. Simultaneously with the improvement in the fine structure the proportion of plastic per unit of volume of the foam body increases.

By way of example, the content of plastic can be brought to the maximum value permissible during production even before the foam is compressed and can then be increased by the amount of the post-compression factor by means of post-compression. Conversely, however, in order to obtain a post-compressed plastic foam with a given content of plastic the proportion of plastic can also be reduced by the amount of the post-compression factor in the uncompressed foam, which helps to attain good homogeneity and continuous production of foam. By way of example a post-compressed carbamide resin foam with a content of carbamide resin of 12.5 kg./cu. m. foam was produced, in which post-compression by the factor 5 had been effected with the result that a carbamide resin content of only about 2.5 kg./cu. m. foam was necessary in the uncompressed foam.

The moisture content for the post-compression effected by a brief heat treatment of well matured, dry-stored carbamide resin foam can, by way of example, be brought to a suitable level by spraying the said foam with one cubic metre of water per 1000 cubic metres of foam. Here, the foam is compressed by the amount of a post-compression factor of 3 to 5, the treatment lasting only 0.1 to 3 seconds and the temperature in the compression apparatus being approximately 250 deg. C.

For the purpose of post-compressing the plastic foam the latter can first be manufactured in the form of blocks or an endless web and this foam mass can then be mechanically subdivided into the size desired for the deformation and post-compression processes. The pieces to be compressed are placed in moulds of suitable dimensions and temperature, the post-compression desired is carried out by squeezing the pieces to a prescribed final measurement and the post-compressed plastic foam is left in the mould only for the treatment time envisaged.

By way of example, completely rounded pieces consisting of carbamide resin were manufactured in this way, the uncompressed foam body, strand 1, of approximately tetragonal cross-section being passed into a cutting device, where it was cut into cube-like bodies, and then into a two-part pressing die which was heated to about 250 deg. C. and each part of which was provided with a semispherical recess. Post-compression and the simultaneous complete rounding of the foam cube is effected in only one to two seconds.

Post-compression, however, is preferably carried out in a continuous process, both with partly and fully hardened foam. Here, it is advantageous to pass the plastic foam, for example, through rotating and possibly heated rolls which produce a post-compression by the desired factor. Here, of course, the process must only exert a brief action, that is to say, the throughput speed and the temperature must be adapted to each other accordingly. In this way elongated bodies such as tubes, semi-circular tubular troughs, channels, and other longitudinal sections can be produced from post-compressed plastic foam.

Of particular advantage is the post-compression, accompanied by heat treatment, of foam bodies consisting of aminoplasts in nozzle-shaped devices for the purpose of producing cylindrical, post-compressed foam cords of any desired length. Here, by way of example, dry-stored, well-matured carbamide resin foam of fine structure is passed in the form of strands of tetragonal, hexagonal or octagonal cross-section through a cylindrical nozzle which is heated to about 250 deg. C., has a circular cross-section and whose diameter tapers from inlet to outlet in the ratio of about 3:1 or 4:1. Set into the inner walls on two opposite sides of the nozzle are endless conveyor belts which facilitate the movement of the foam strand through the nozzle. The necessary moistening of the foam strand is effected either before the latter enters the nozzle or by steam supplied through suitable ducts in the nozzle walls. The strand remains in the nozzle for about one to two seconds. The post-compressed strand can, on emerging, be passed through additional, heated nozzles to enable its outer surface to be smoothed. The thickness of such post-compressed, cylindrical cords is only about 0.5 mm.

This economical, interesting method enables, according to the invention, not only pure foam products to be treated but also those foam masses which are mixed with substances of a granular or fibrous type. It is also possible to apply this up-to-date method with the greatest success if laminated materials such as paper or foils are added, the direction of the layers in these laminated materials being of no importance.

An apparatus for carrying out one of the methods of the present invention is illustrated, by way of example only, diagrammatically and in side view in the accompanying drawing.

The drawing shows a roller 1 carrying a web 3 of urea formaldehyde resin foam (carbamide resin foam) which is withdrawn from the roller 1 in the direction of the arrow 6 and passed under a moisture-applying device 2. By way of example, the device 2 may spray water upon a surface of the web. Shortly thereafter the web 3 is guided between two heated rollers 4 and 5 which are driven by any suitable means (not shown) in the directions of the arrows 7 and 8. The distance between the two rollers 4 and 5 is smaller than the thickness of the web 3 leaving the roller 1. The pressure as well as the heat exerted upon the moisture-carrying web 3 will compress the web which will retain this compressed state after leaving the rollers 4 and 5. The mechanical properties of the web leaving the rollers 4 and 5 are considerably better than those of the same web prior to this treatment by the rollers.

Having now particularly described and ascertained the nature of our said invention and in what manner the same is to be performed, we declare that what we claim is:

A method of densifying carbamide resin foam, said method comprising the steps of continuously moving a web of dried and set foam, wetting the moving web by spraying water thereon at the rate of substantially one cubic meter of water per 1000 cubic meters of foam, and densifying the moving wet foam by compression by a post-compression factor of 3 to 5 while heating its surfaces to substantially 250° C., the compression and heating continuing for a time period from 0.1 to 3 seconds, whereby decomposition of the foam during heating is prevented by its moisture content during compression.

References Cited in the file of this patent

UNITED STATES PATENTS

| | | |
|---|---|---|
| 1,904,268 | Bronson | Apr. 18, 1933 |
| 1,978,041 | Dodge | Oct. 23, 1934 |
| 2,117,179 | Kopp | May 10, 1938 |
| 2,161,308 | Murphy et al. | June 6, 1939 |
| 2,327,001 | Schott | Aug. 17, 1943 |
| 2,336,944 | Madge et al. | Dec. 14, 1943 |
| 2,384,387 | Meyer | Sept. 4, 1945 |
| 2,414,177 | Smith | Jan. 14, 1947 |
| 2,659,935 | Hammon | Nov. 24, 1953 |

FOREIGN PATENTS

| | | |
|---|---|---|
| 905,731 | France | Dec. 12, 1945 |